H. MARGOLIS.
CLUTCH MECHANISM.
APPLICATION FILED SEPT. 11, 1917.
1,278,705.
Patented Sept. 10, 1918.
3 SHEETS—SHEET 1.
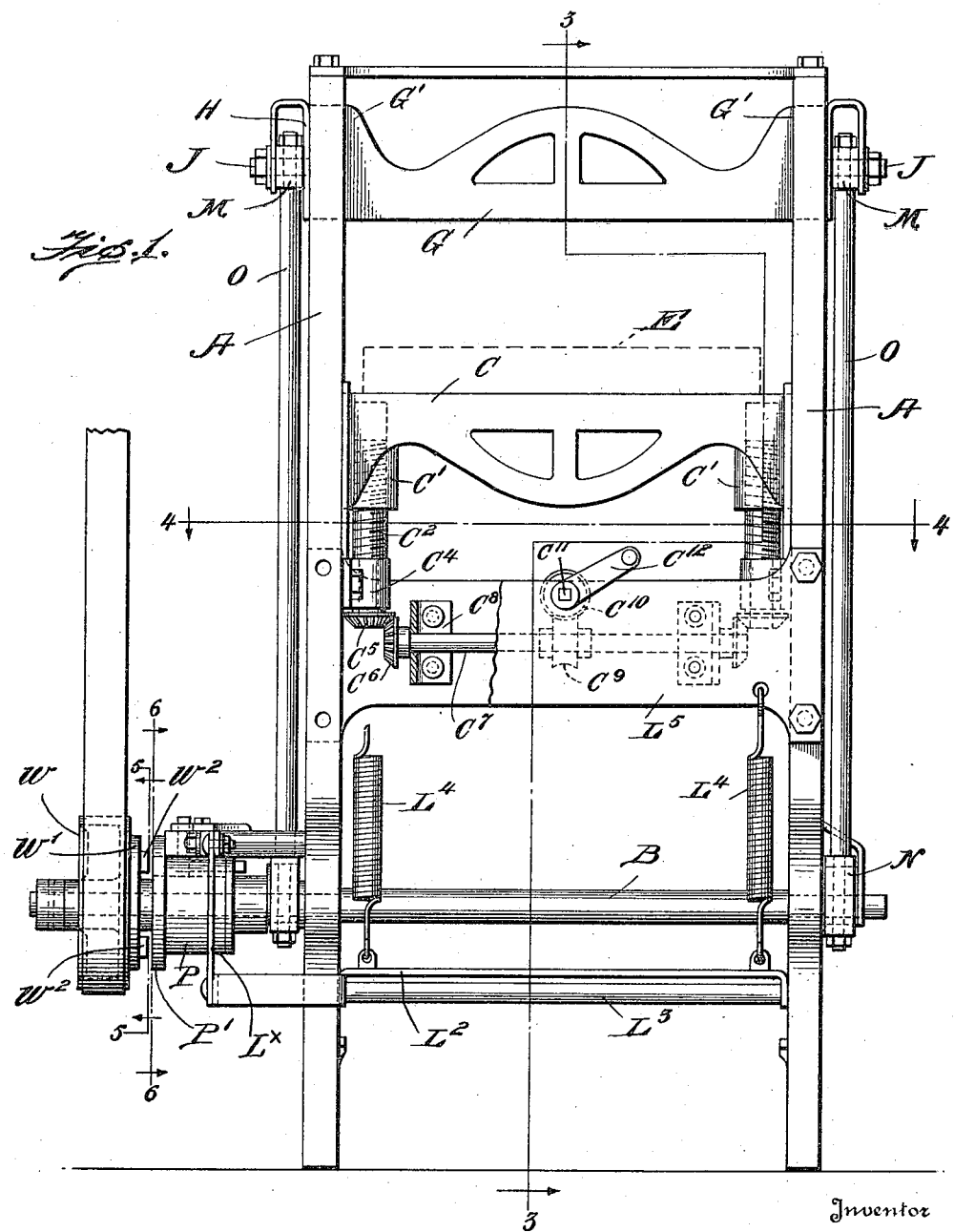
Witness
B. M. Offutt
A. L. Hough
Inventor
Herman Margolis,
By Francis L. Hough
Attorney

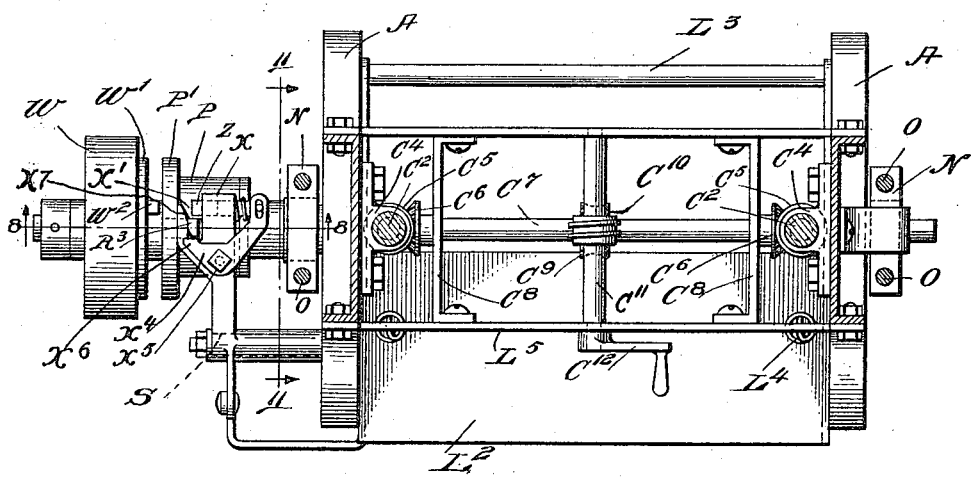
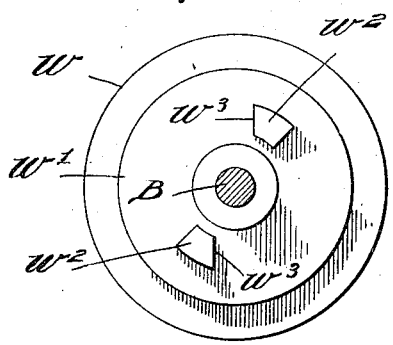
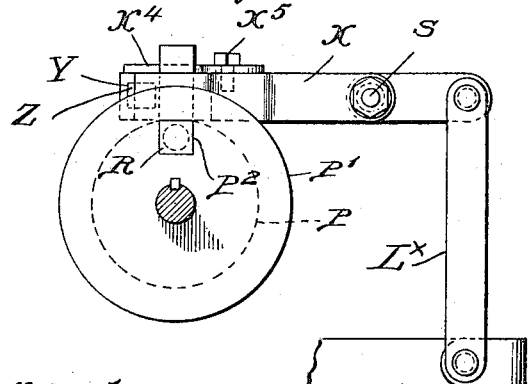
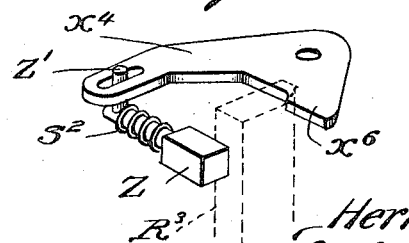

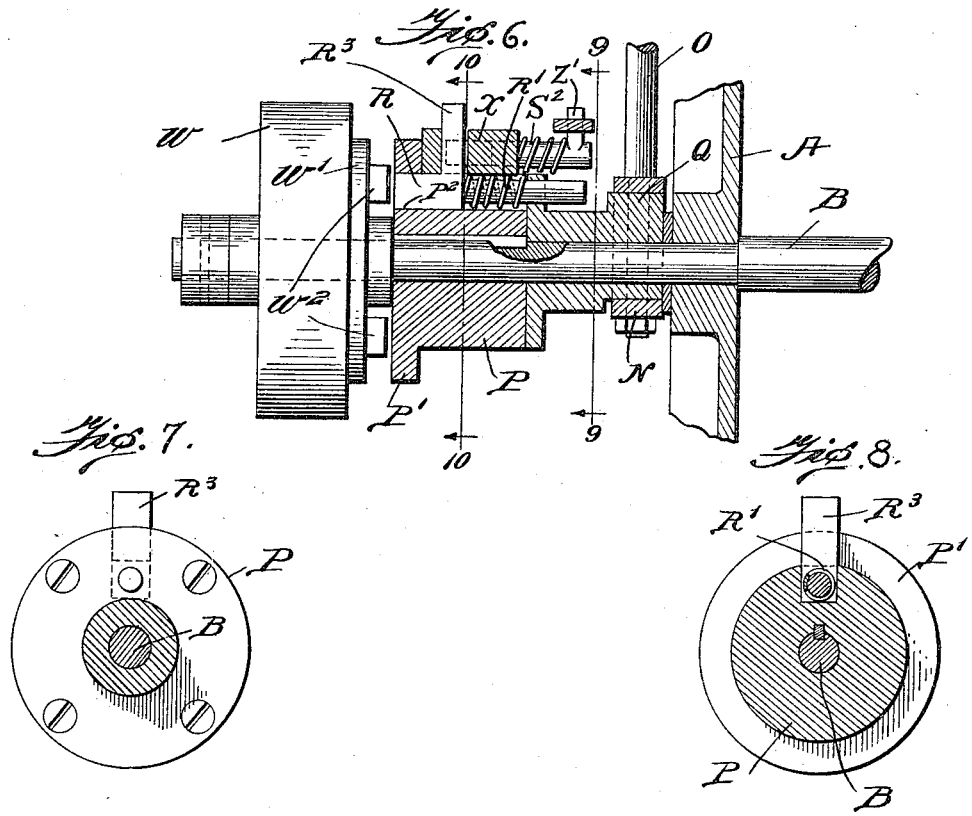

UNITED STATES PATENT OFFICE.

HERMAN MARGOLIS, OF SOMERVILLE, MASSACHUSETTS.

CLUTCH MECHANISM.

1,278,705.   Specification of Letters Patent.   Patented Sept. 10, 1918.

Application filed September 11, 1917. Serial No. 190,813.

*To all whom it may concern:*

Be it known that HERMAN MARGOLIS, a citizen of the United States, residing at Somerville, in the county of Middlesex and State of Massachusetts, have invented certain new and useful Improvements in Clutch Mechanism; and he does hereby declare the following to be full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in clutch mechanism for machines of various kinds and controlled by suitable treadle mechanism.

My invention consists further in a simple and efficient device of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a side elevation, showing the application of my invention to a sole cutting machine. Fig. 2 is a sectional view on line 4—4 of Fig. 1, showing in plan view the clutch mechanism. Fig. 3 is a sectional view on line 5—5 of Fig. 1. Fig. 4 is a sectional view on line 6—6 of Fig. 1, looking in the direction of the arrow. Fig. 5 is a detailed perspective view, of a part of the clutch mechanism. Fig. 6 is a sectional view on line 8—8 of Fig. 2. Fig. 7 is a vertical sectional view on line 9—9 of Fig. 6, and Fig. 8 is a sectional view on line 10—10 of Fig. 6.

Reference now being had to the details of the drawings by letters:

A designates the frame of a sole cutting machine in which a driving shaft B is journaled in suitable bearings. Mounted to have a vertical adjustment upon said frame is a bed C upon which the article to be cut rests, and E designates a die cutter, shown in dotted lines, which may be of any shape or size adapted to be placed upon the work to be cut. Said bed has bosses C' projecting from the lower portion thereof which are centrally threaded to receive the screws $C^2$ mounted in the bearings $C^4$ upon the frame and at the lower end of each screw $C^2$ is fixed a bevel gear $C^5$, in mesh with the bevel gear $C^6$ keyed to the shaft $C^7$, which latter is journaled in the bracket member $C^8$. A gear $C^{10}$ is fixed to the shaft $C^7$ and in mesh with the worm gear $C^{10}$ and the shaft $C^{11}$, to which is fastened a handle $C^{12}$, and affording means for raising and lowering the bed.

Mounted to have a vertical reciprocating movement within the recess F upon the frame is a beam G which imparts a blow to the die for the purpose of cutting the sole from the material beneath. Said beam has shouldered portions G' adapted to guide the beam in its vertical movements, and plates H are fastened to the ends of the beam and also serve as guides. Studs J project one from each end of said beam and upon which are mounted a block M, through which the upper ends of the rods O pass. Similar blocks N having circular outlined openings for the reception of the eccentric disks Q fixed to the shaft B are mounted on the lower ends of the rods O. By this mechanism, it will be noted that as the shaft B is rotated, a reciprocating movement will be imparted to said beam. A collar P having a flange P' is keyed to the shaft B and carries a spring pressed key R mounted in a slot $P^2$ in said collar, and R' designates a coiled spring mounted upon the shank portion of the key and bears intermediate the laterally projecting finger $R^3$ and the inner end of the slot in which the key is positioned as shown in Fig. 6 of the drawings. A driving pulley W is loosely journaled upon the shaft B and has a boss W' projecting from its inner face and from which project diametrically opposite lugs $W^2$, having each an inclined face $W^3$ (Fig. 5 of the drawings) and which are adapted to contact with the key R when the latter is thrown out into the paths of said lugs $W^2$. The purpose of said spring is to normally hold the key in such a position that its outer end will project beyond the outer face of the collar and in the paths of the lugs $W^2$ which project from the face of the clutch disk T', which latter is journaled loosely upon the shaft B and is driven continuously by any power, not shown.

Pivotally mounted upon a shaft S projecting horizontally from the frame is a lever X, shown in Figs. 1, 2 and 4 of the drawings, having a slot X' formed in one end thereof. The end of one wall of said slot is provided with an aperture Y adapted to receive the locking pin Z which is pivoted at one end to the angled member $X^4$, which is pivotally mounted upon the pin $X^5$ upon the lever. Said member $X^4$ has a flattened end finger $X^6$ which is adapted to be positioned across the inner end of the slot in the end of the lever and forming an abutment against which the finger $R^3$ of the locking key is adapted to contact, for the purpose of positively throwing the pin Z into a locking relation with reference to said finger. A spring $S^2$ is mounted upon the pin Z and bears between the edge of lever X and the pin $Z'$, as shown in Fig. 6 of the drawings, on said locking pin Z and serves to hold the locking pin out of locking position.

A treadle, designated by letter $L^2$ is pivotally mounted upon the shaft $L^3$ upon the frame and is held at its upper limit through the medium of the springs $L^4$ which are fastened to the treadle at their lower ends and their upper ends to the cross piece $L^5$ of the frame, and $L^x$ designates a link pivoted at one end to the treadle and its other end to said lever.

In operation, it will be understood that the shaft and collar carrying the same are normally at rest with the key held back within the collar and when it is desired to permit a single revolution to be imparted to the shaft B for the purpose of cutting the sole, the operator by depressing the treadle to its lowest limit and immediately releasing the latter will cause the lever X to tilt upon its pivot and its forward end will be thrown out of engagement with the finger upon said key, permitting the latter to be thrown out into the path of one of the lugs $W^2$ upon the continuously rotating driving disk. As the lever X is tilted by the depression of the treadle to its lowest limit, the slotted end of the lever X will release the key R, and when the end $X^6$ of the lever $X^4$ rises above the upper end of the finger $R^3$ of said key, the spring $S^2$, interposed between the slotted end of the lever $X^4$, engaged by the lug $X'$ of the member Z, will cause the lever $X^4$ to tilt upon its pivot and the member Z will be withdrawn out of the path of the finger $R^3$. Immediately after the treadle is depressed and released, it will return to its normal position, as will also the lever X, through the medium of the spring $L^4$. After the collar has made a complete revolution, the finger of the key coming in contact with the inclined portion of the lever, will cause the key to be thrown out of engagement with the clutch lug $W^2$, and as the finger comes in contact with the end $X^6$ of the lever $X^4$, said end $X^6$ will serve as a stop, the key of the member Z being thrown under tension of the spring $S^2$ back to its normal position behind the finger, as shown in Fig. 2 of the drawings, thus securely holding the collar locked. Each time the treadle is depressed and immediately released, a single rotary movement will be imparted to the collar and parts actuated thereby.

By the foregoing mechanism, it will be understood that by a single rotary movement being permitted to the collar and the reciprocating beam actuated thereby for the purpose of imparting a blow to the cutting die, the parts may be stopped automatically after the beam has struck the die and returned to its starting position.

What I claim to be new is:

A clutch mechanism, comprising a frame, a driven shaft, and a continuously rotatable pulley loosely journaled thereon, clutch lugs projecting from said pulley, a collar keyed to the driven shaft, a spring pressed key mounted upon said collar, and having a finger projecting therefrom, a tilting spring pressed treadle actuated lever normally holding said key out of the path of said clutch lugs, said lever when tilted adapted to release the key into the paths of the clutch lugs, an angle lever pivotally mounted upon the treadle actuated lever, a spring pressed pin pivotally connected to said angle lever and movable through a slot in the treadle actuated lever, one end of the angle lever adapted to be positioned in the path of said finger, against which it contacts, as the collar makes a single revolution, and a spring pressed locking pin carried by the angle lever.

In testimony whereof I hereunto affix my signature in presence of two witnesses.

HERMAN MARGOLIS.

Witnesses:
A. L. HOUGH,
I. WHITTEMORE.

Copies of this patent may be obtained for five cents each, by addressing the "Commissioner of Patents, Washington, D. C."